Aug. 28, 1962 H. N. HILL ET AL 3,051,217
STRETCHING MECHANISMS
Filed July 11, 1958

INVENTORS
HARRY N. HILL
JOHN W. CLARK
WILTON A. WOODBURN

BY

ATTORNEY

United States Patent Office 3,051,217
Patented Aug. 28, 1962

3,051,217
STRETCHING MECHANISMS
Harry N. Hill, Apollo, and John W. Clark and Wilton A. Woodburn, New Kensington, Pa., assignors to Aluminum Company of America, Pittsburgh, Pa., a corporation of Pennsylvania
Filed July 11, 1958, Ser. No. 748,057
3 Claims. (Cl. 153—35)

This invention relates to the art of stretch straightening and/or stretch forming plastically and permanently deformable materials, as well as to equipment for carrying out such practices.

Investigation of existing and available stretching equipment has left much to be desired and has clearly developed the fact that presently practiced technique and available stretching equipment have employed empirically established features and factors, which have resulted in the provision and existence of inferior equipment, and in many cases, completely erroneous concepts in the basic requirements of satisfactory and economically constructed stretching mechanism.

In this connection, we have discovered that stretching equipment could fail to develop full capacity if the clamping effort was insufficient to retain the material within the material clamping devices, or if this effort was too large and caused shearing of the material between the clamping devices before the required permanent deformation of the material had been attained. It was further found that these conditions of failure were dependent upon the relative magnitude of stretching and clamping forces, physical dimensions of the material clamping devices, and properties of the material to be stretched, and that an optimum combination of these factors and application of the knowledge of their existence and relationship has resulted in the provision of more efficient and superior material clamping and stretching equipment than heretofore available.

Based on the aforesaid discoveries, it is an object of the present invention to provide a stretching mechanism incorporating material clamping means capable of developing the required clamping force on material grasped and clamped thereby with a minimum requirement of force or load resisting structure supporting the material clamping means.

Another object of the invention is to provide a material stretching apparatus incorporating material clamping means in the form of wedge shaped clamping jaws supported on inclined planes, the angle of which planes has been established to develop required holding and clamping pressures on the material with minimum strength requirements in the housing supporting the jaws.

Still another object is to provide material clamping means and structure supporting or housing the same, which insure stretching a material beyond its yield strength value in the absence of failure of the material being stretched through shear thereof adjacent the clamping means.

It is a further object to provide a method of stretching plastically deformable material to permanently stretch and/or form the material in the absence of premature failure of the material.

Other objects and advantages will be understood and appreciated from a consideration of the following description and illustrations, in which.

Figure 1:
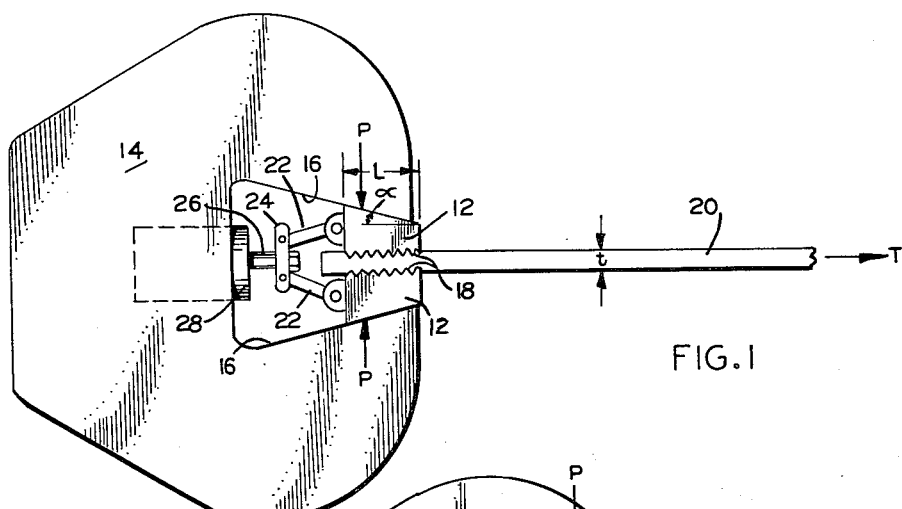
FIG. 1 represents a side elevational view of the essential elements of one end of a stretching mechanism incorporating an embodiment of wedge shaped material clamping jaws falling within the scope of the invention.

In general terms, stretch flattening and stretch forming equipment, to which the present invention is addressed, comprises at least one pair of material clamping jaws supported in a suitable housing adjacent one or both ends of a length of material to be stretched under sufficient load to permanently deform the same. Means must be provided to move the jaws, preferably simultaneously, into and out of clamping relationship on opposite surfaces of the material to be stretched, to permit loading and unloading of the stretching mechanism, and load exerting means is essential to maintain the jaws in clamped relationship on the material during axial stretching movement of the same between its clamped ends, as by axial separation thereof.

In the case of sheet and strip material of substantial width, in respect to gauge thickness, segmental articulated jaw elements are normally employed across the width of the material, as described and illustrated in United States Letters Patent No. 2,218,503, to provide selective movement of the jaw segments in pairs into clamping relationship with the material to be stretched.

In more specific terms, and on reference to the attached drawing, it will be observed that a pair of jaws 12 (FIG. 1) are mounted within a housing or yoke 14 of generally C-shape, the jaws being generally wedge shaped and supported on inclined surfaces 16 defining an open entrance throat to the yoke 14. The material-clamping faces or surfaces of the jaws are preferably generally flat parallel surfaces, and may be serrated at 18 to improve the biting and gripping action thereof into opposite substantially parallel surfaces of the material 20 clamped therebetween.

The wedge shaped jaws 12 are preferably manipulatively attached through a pair of links 22, each of which is pivotally attached at one of its ends to one of the jaws 12 and at its opposite end to a yoke 24 rigidly attached to a piston rod 26 constituting a unitary part of a piston received within a cylinder 28 suitably supported by the yoke 14. The piston, cylinder and link arrangement described above is preferably duplicated for each pair of jaws 12 and constitute the manipulative mechanism for advancing the jaws 12 in unison along their inclined supporting surfaces 16 within the throat of the housing 14 to thereby provide engagement and disengagement of each pair of jaws 12 with the material 20 in the normal use of this embodiment of the stretch flattening or stretch forming equipment of the invention.

Figure 2:
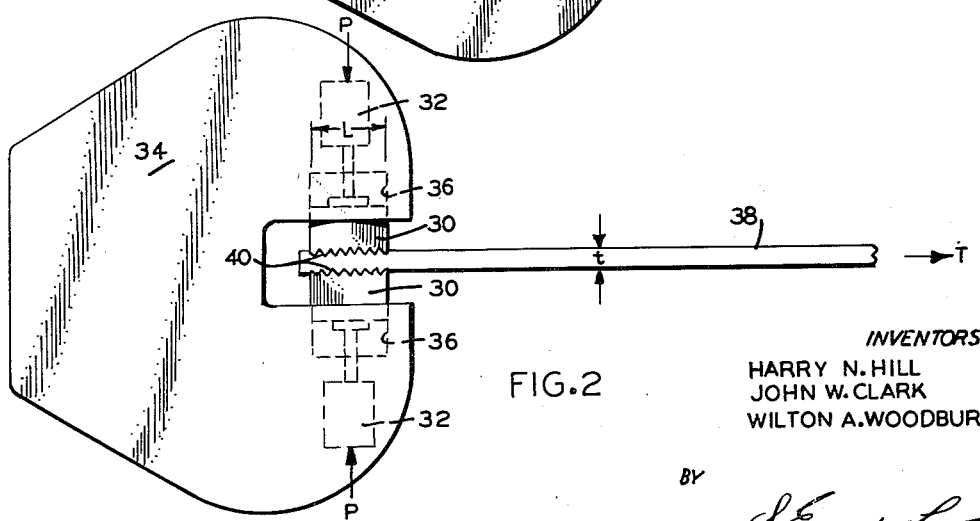
FIG. 2 represents a similar side elevational view of the essential elements of the end of a stretching mechanism incorporating an embodiment of flat material clamping jaws of the invention.

In FIG. 2 a pair of flat, plate-like material clamping jaws 30 have been illustrated, each jaw of the pair being directly attached with cylinder and piston devices 32 carried by a yoke or housing 34 provided with recessed guides 36 in which the jaws 30 are reciprocally mounted for movement into and out of clamping engagement with material 38 to be stretch straightened or stretch formed. As in the case of the previously described wedge shaped jaws 12, jaws 30 are preferably serrated at 40 to improve their bit into the oppositely engaged substantially parallel surfaces of material 38 clamped therebetween.

Figure 3:
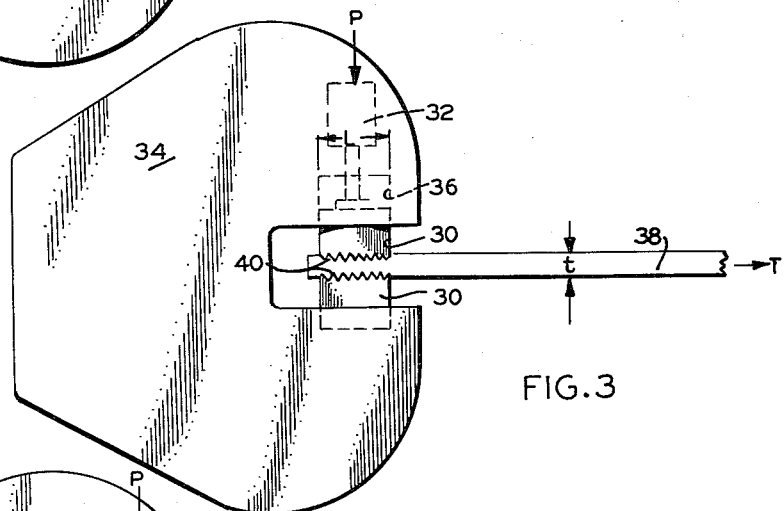
FIG. 3 represents a side elevational view similar to FIG. 2 with one of the material clamping jaws thereof held stationary.

FIG. 3 is a further embodiment of the invention based on the flat, plate-like material gripping jaws illustrated in FIG. 2. In FIG. 3, the lower plate-like jaw 30 is fixed or stationary in the housing 34, and the apparatus is otherwise identical to the embodiment of FIG. 2.

In the preferred practice of the invention, the housings 14 and 34 are each mounted on a suitable base frame (not shown) and a duplicate housing and complementary jaws are preferably provided at the opposite end of the base frame in each embodiment of the invention, at least one of the housings being relatively movable, under the influence of applied power, to apply a stretch loading force on the material, which is grasped and clamped securely between the jaws 12 or 30 supported within the housings 14 or 34, respectively, at the ends thereof.

Each of FIGS. 1, 2 and 3 has applied thereon the designating letters "P," "T," "L" and "t" to respectively identify the total clamping force exerted by the jaws 12 and 30; the total stretching load T exerted on the material 20 and 38; the axial length of jaws 12 and 30 in clamping engagement with oppositely disposed substantially parallel surfaces of the material 20 and 38; and the gauge thickness of the material 20 and 38. In FIG. 1, the angle "α" designates the angle of inclination of jaws 12 in supporting sliding contact on inclined surface 16 within the housing 14.

Research based on tests conducted on "aluminous products," by which term is meant wrought products of aluminum and its alloys, where aluminum is present in amounts at least fifty percent of the weight of the aluminous products, has resulted in establishing values for P, L, T, $t$ and $\alpha$, in respect of the physical properties of the material undergoing stretch straightening or stretch forming operations, which make it now possible to scientifically provide material stretching equipment the strength and capacity of which will meet any desired operating conditions and requirements.

For example, using equipment incorporating substantially flat plate-like clamping jaws, such as illustrated in FIGS. 2 and 3, optimum results in the practice of the invention are attained by employing a $P/T$ ratio within the range 0.75 to 1 and an $L/t$ ratio within the range of 2 to 10 in stretch forming wrought materials exhibiting or characterized by a $$\frac{\text{shear strength}}{\text{stretching stress}}$$

ratio within the range 0.6 to 2, which is inclusive of the above-defined wrought aluminous products. Using the wedge shaped material gripping jaws of FIG. 1, and maintaining the above stated ratio and range values for P, T, L and $t$, it was discovered essential in the practice of the invention to select and maintain an $\alpha$ value within the range 21° to 28°.

Applying the teachings and practice of the invention by employing the relationships and numerical values stated in the previous paragraph in the construction of an 8000 ton capacity sheet stretcher, as much as a thirty percent reduction in the cross section resisting fracture of the C-shaped yoke or housing 14 supporting wedge shaped material clamping jaws, such as the jaws 12 of FIG. 1, was possible over that dictated by mere proportional increase of a similarly constructed and regularly used C-shaped yoke housing for an existing 750,000 pound stretcher. The increased capacity stretcher has also been observed in commercial use to develop its intended capacity in the absence of clamping failure or premature shearing of the material being stretched.

Expressing the invention in terms of method steps in the performance of a stretching operation, it has been discovered that successful stretch straightening, flattening, or permanent deformation of a plastically deformable material can only be obtained when the material is clamped adjacent each of its ends over an axial length thereof expressible in terms of an $L/t$ ratio within the range of 2 to 10, while under a clamping force P on the material so clamped and under an axial stretching force T exerted thereon expressible in terms of a $P/T$ ratio within the range of 0.75 to 1, where L is equal to the axial length of the material clamped adjacent each of its ends, $t$ is equal to the gauge thickness of the material, P is equal to the total clamping force on the material, and T the total applied stretching force.

It will be apparent to one skilled in the art that mechanism other than that specifically described hereinabove, may be substituted therefor, without in any way detracting from the invention, and it is not intended that the same be limited to the precise apparatus and mode of practice of the invention hereinabove described, except as defined in the following claims.

We claim:
1. In a stretching mechanism for permanently stretch deforming wrought material characterized by a

$$\frac{\text{shear strength}}{\text{stretching stress}}$$

ratio of 0.6 to 2, the mechanism having at least one pair of material clamping jaws, a housing for supporting said jaws in relatively movable relationship into and out of clamping engagement on opposite substantially parallel surfaces of the material to be stretch deformed, pressure exerting means for holding the jaws in clamped relationship on the material, and means for manipulating the housing and jaw-clamped material to exert tension thereon, the improvement comprising a material engaging length L for each jaw member axially in the direction of stretch defined in terms of an $L/t$ ratio within the range of 2 to 10, where $t$ is the gauge thickness of the material, the pressure exerting means of the jaws having a capacity to deliver a total material clamping force P and the means for translating the housing having a capacity to deliver a total stretching force T, and the ratio $P/T$ falling within the range 0.75 to 1, the said defined $L/t$ and $P/T$ ratios being compatibly correlated and insuring permanent stretch deformation of the material to be stretched beyond its yield strength in the absence of failure by shear of the material between the clamping jaws.

2. In a stretching mechanism for permanently stretch deforming wrought material characterized by a $$\frac{\text{shear strength}}{\text{stretching stress}}$$

ratio of 0.6 to 2, the mechanism having at least one pair of material clamping jaws supported in oppositely disposed relationship on inclined supports within a housing carrying said jaws, means for manipulating said jaws into substantially parallel surface engagement with opposite surfaces of the material to be stretch deformed to securely clamp the same relative to the housing, pressure exerting means for holding the jaws in clamped relationship on the material, and means for manipulating the housing and jaw-clamped material to exert tension thereon, the improvement comprising establishing the inclined supports for each of the jaws at an angle of 21° to 28° to the plane of substantially parallel engagement with the material being stretch deformed, a material engaging length L for each jaw member axially in the direction of stretch defined in terms of an $L/t$ ratio within the range of 2 to 10, where $t$ is the gauge thickness of the material, the pressure exerting means on the jaws having a capacity to deliver a total material clamping force P and the means for manipulating the housing having a capacity to deliver a total stretching force T, and the ratio $P/T$ falling within the range of 0.75 to 1, the said defined $L/t$ and $P/T$ ratios and inclined supports for the jaws between 21° to 28° being compatibly correlated and insuring permanent stretch deformation of the material to be stretched beyond its yield strength in the absence of failure by shear of the material between the clamping jaws and a reduction in the lateral spreading force exerted by the jaws.

3. A method of permanently stretch deforming wrought material characterized by a $$\frac{\text{shear strength}}{\text{stretching stress}}$$

ratio of 0.6 to 2, the steps comprising, providing a sheet of the wrought material of substantially uniform gauge over the length thereof in the direction of tensile stretching, clamping opposite substantially parallel surfaces of the sheet adjacent opposite ends thereof over an axial length L at each end of the sheet, confining the length of L by the ratio $L/t$ within the range 2 to 10, where $t$ is equal to the gauge thickness of the sheet, exerting a total clamping force P on the L length of the sheet at each end thereof, and exerting a total axial tensile force between the so clamped ends of the sheet to permanently stretch deform the same beyond the yield strength of the sheet, said forces P and T being expressible in terms of a P/T ratio within the range 0.75 to 1.

References Cited in the file of this patent

UNITED STATES PATENTS

| | | |
|---|---|---|
| 187,957 | Baldwin | Mar. 6, 1877 |
| 1,120,798 | Duecker | Dec. 15, 1914 |
| 2,183,969 | McKinney | Dec. 19, 1939 |
| 2,349,520 | Ripley | May 23, 1944 |
| 2,445,876 | Fullerton | July 27, 1948 |
| 2,596,772 | Hawkes | May 13, 1952 |
| 2,702,929 | Laddon | Mar. 1, 1955 |
| 2,776,695 | Wells | Jan. 8, 1957 |

OTHER REFERENCES

Publication: "A New System of Weighing Machinery," pages 229–241, received in Div. 36 on Feb. 11, 1937. (Copy in 73–97.)